United States Patent
Nipane et al.

(10) Patent No.: US 9,977,688 B2
(45) Date of Patent: May 22, 2018

(54) LIVE MIGRATION OF VIRTUAL MACHINES ACROSS VIRTUAL SWITCHES IN VIRTUAL INFRASTRUCTURE

(71) Applicant: VMware, Inc., Palo Alto, CA (US)

(72) Inventors: Nilesh Nipane, Mountain View, CA (US); Jia Yu, Sunnyvale, CA (US); Chi-Hsiang Su, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 163 days.

(21) Appl. No.: 14/986,041

(22) Filed: Dec. 31, 2015

(65) Prior Publication Data

US 2016/0196158 A1     Jul. 7, 2016

Related U.S. Application Data

(60) Provisional application No. 62/098,993, filed on Dec. 31, 2014.

(51) Int. Cl.
*G06F 9/46*     (2006.01)
*G06F 9/455*     (2018.01)

(52) U.S. Cl.
CPC .. *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 2009/0292858 A1* | 11/2009 | Lambeth | ........... | H04L 29/12839 711/6 |
| 2011/0085563 A1* | 4/2011 | Kotha | ................. | H04L 41/0816 370/401 |
| 2012/0227041 A1* | 9/2012 | Lambeth | ........... | H04L 29/12839 718/1 |
| 2013/0019277 A1* | 1/2013 | Chang | ................. | H04L 63/0218 726/1 |
| 2014/0280547 A1* | 9/2014 | DeCusatis | ............... | H04L 67/34 709/204 |
| 2014/0366155 A1* | 12/2014 | Chang | ..................... | G06F 21/10 726/27 |
| 2015/0324215 A1* | 11/2015 | Borthakur | ........... | G06F 9/45558 718/1 |

* cited by examiner

*Primary Examiner* — Diem Cao
(74) *Attorney, Agent, or Firm* — Patterson & Sheridan LLP (57) ABSTRACT

Techniques are described for migrating virtual machines (VMs) across virtual switches. To migrate a VM, a destination distributed virtual switch module may, prior to migration, instantiate a distributed virtual port on a destination VM host and reserve the distributed virtual port for each virtual network adapter of the VM. Further, a configuration file for the VM specifying the distributed virtual ports reserved for the virtual network adapters may be copied from a source VM host to the destination VM host or created in the destination VM host. As part of the migration, network state data of the distributed virtual ports used by the VM at the source VM host is copied and applied to the appropriate reserved distributed virtual ports on the destination host. Then, when the migrated VM is powered on at the destination host, the VM configuration specifying the reserved distributed virtual ports is used to attach the virtual network adapters of the VM to the reserved distributed virtual ports.

17 Claims, 3 Drawing Sheets

LIVE MIGRATION OF VIRTUAL MACHINES ACROSS VIRTUAL SWITCHES IN VIRTUAL INFRASTRUCTURE

CROSS-REFERENCE TO RELATED APPLICATIONS

This Application claims benefit of U.S. Provisional Patent Application No. 62/098,993 filed Dec. 31, 2014, which is incorporated herein by reference in its entirety.

BACKGROUND

Computer virtualization is a technique that involves encapsulating a computing machine platform into a virtual machine (VM) that is executed under the control of virtualization software running on a hardware computing platform (also referred to herein as "host server" or "host"). A group of hardware computing platforms may be organized as a cluster to provide resources for VMs. In a data center, it is common to see hundreds, even thousands, of VMs running on multiple clusters of host servers.

A virtual infrastructure administrator may use virtualization management software to manage virtual machine configurations and computing resource allocations. One feature of the virtualized computing environment controlled by the virtualization management software is virtual networking. VMs can be created with software-based virtual network adapters that are logically connected to a virtual switch that is further connected to physical network adapters installed in the host computer. One approach for managing virtual network connections in data centers with a large number of VMs running on multiple host servers is the distributed virtual switch described in U.S. Pat. No. 8,195,774, incorporated by reference in its entirety herein. A distributed virtual switch is an abstraction of a switch across multiple host servers that permits virtual switches on the multiple host servers to be managed as if ports of those virtual switches belonged to a single switch, the distributed virtual switch. The distributed virtual switch may have uplinks which connect to physical network adapters, as well as VM ports which provide connections for VMs running in the host servers.

Traditionally, VMs and distributed virtual switches are managed by virtualization management software that provides a cloud management system, such as VMware vCenter Server™ which is commercially available from VMware, Inc, of Palo Alto, Calif. For load balancing and other purposes, VMs may be migrated between servers in a cluster, such as with VMware vMotion® technology available from VMware, Inc. However, a VM connected to one distributed virtual switch traditionally could not be live migrated across distributed virtual switches, as the migrated VM's configuration file would still point to network resources backing the original distributed virtual switch and not the destination distributed virtual switch. As a result, VMs also could not be migrated across cloud management systems which provide distinct distributed virtual switches, even where a logical network (e.g., VLAN or VXLAN) stretches across multiple such cloud management systems and/or distributed virtual switches so that it would be otherwise possible to migrate the VM without virtual network reconfiguration.

For example, a VXLAN may be used to create a layer two (L2) overlay network to stretch across two or more layer three (L3) networks. Doing so allows VMs to live migrate across different L3 networks and still operate as if they are connected to the same L2 network. Accordingly, it is possible to move VMs across subnets without any virtual network reconfiguration. However, even where the VXLAN network is stretched across multiple distributed virtual switches, live migration of VMs is traditionally limited to only those VM hosts that belong to the same distributed virtual switch the VM to be migrated belongs, rather than anywhere within the VXLAN network segment, which may require migrating the VM across distributed virtual switches. As discussed, if the VM is migrated across distributed virtual switches, then the VM's configuration file would still point to network resources backing the original distributed virtual switch and not the destination distributed virtual switch. As another example, VLAN backed virtual networks may span across multiple distributed virtual switches due to administrative reasons (e.g., there may be a single distributed virtual switch per VM host cluster). However, VMs could not be migrated across distributed virtual switches in such a VLAN backed environment.

SUMMARY

One embodiment disclosed herein provides a method for migrating a virtual machine (VM) across virtual networks. The method generally includes allocating a respective distributed virtual port on a destination distributed virtual switch for each of one or more virtual network adapters of the VM, and receiving copied network states of distributed virtual ports, on a source distributed virtual switch distinct from the destination virtual switch, to which the VM is connected prior to a VM migration. The method further includes applying, to the allocated distributed virtual ports on the destination distributed virtual switch, the copied network states. In addition, the method includes, subsequent to the VM migration, connecting the virtual network adapters of the VM to the allocated distributed virtual ports on the destination distributed virtual switch.

Further embodiments of the present invention include a computer system configured to carry out the above method, and a non-transitory computer-readable storage medium comprising instructions that cause the computer system to carry out the above methods.

DETAILED DESCRIPTION

Embodiments disclosed herein provide techniques for migrating virtual machines (VMs) across virtual networks. In one embodiment, the virtual switches may be distributed virtual switches, such as distributed virtual switches provided by distinct cloud management systems. To migrate the VM from a source distributed virtual switch to a destination distributed virtual switch, a distributed virtual switch module running in the destination cloud management system may, prior to the VM's migration, instantiate and reserve a distributed virtual port for each virtual network adapter of the VM. This may include creating the distributed virtual ports and sending the distributed virtual ports' configuration information down to VM hosts which instantiate the distributed virtual ports therein. Further, a configuration file for the VM that is modified to specify the distributed virtual ports reserved for the virtual network adapters may be copied from the source VM host to the destination VM host or created in the destination VM host. During VM migration, not only is the execution state of the VM copied from the source VM host to the destination VM host, but network state data of the distributed virtual ports originally used by the VM at the source VM host is also copied and applied to the corresponding reserved distributed virtual ports on the destination host. Then, when the migrated VM is resumed on the destination host, the VM configuration specifying the reserved distributed virtual ports is used to attach (i.e., connect) the virtual network adapters of the migrated VM to the appropriate reserved distributed virtual ports. The VM can thus be migrated across distributed virtual switches or other virtual networks, and such migrations may be transparent to applications running in the VM.

Figure 1:
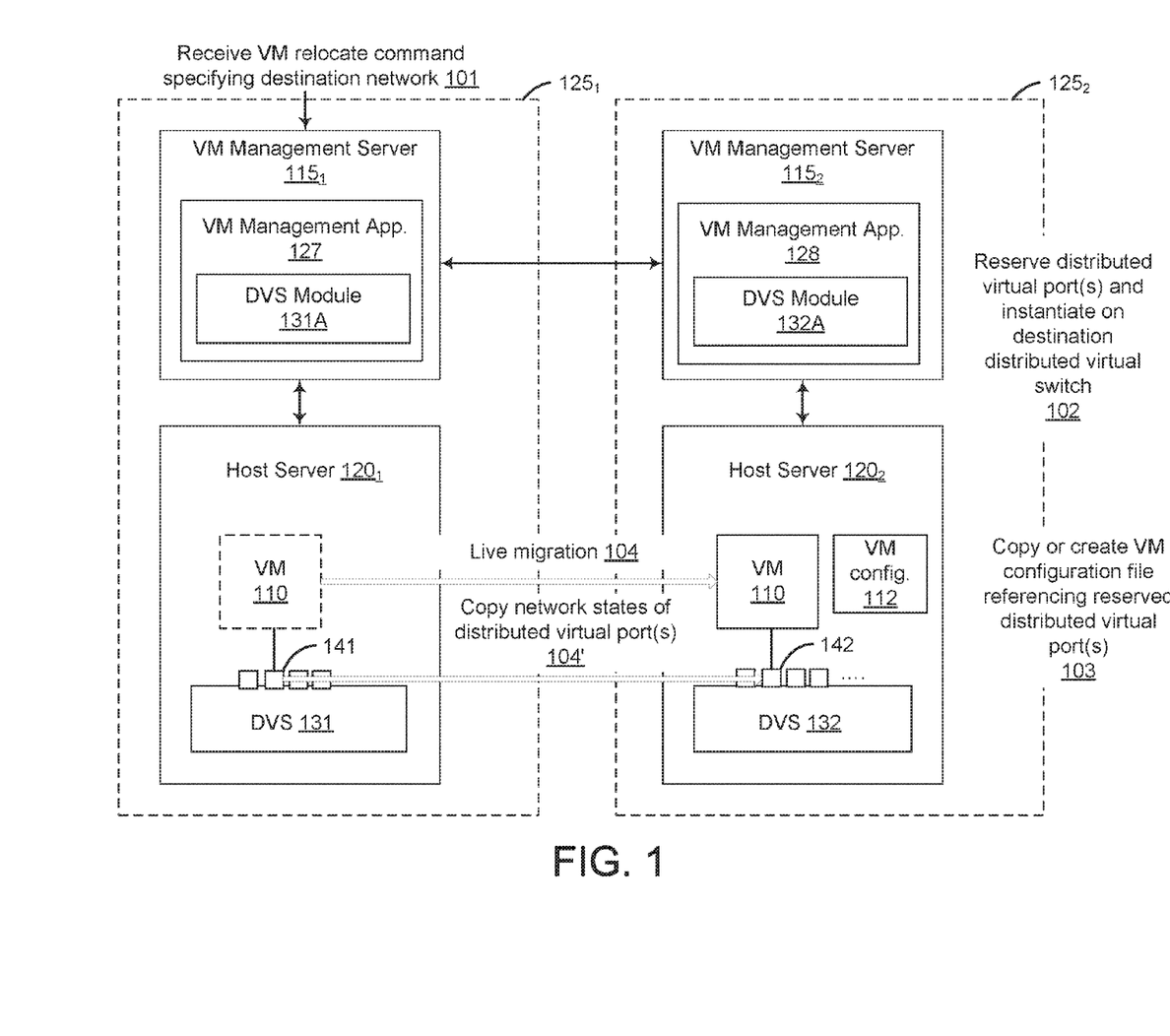
FIG. 1 is a block diagram depicting migration of virtual machines across virtual switches in a virtual infrastructure, according to an embodiment.

FIG. 1 is a block diagram depicting migration of virtual machines across virtual switches in a virtual infrastructure, according to an embodiment. As shown, a VM 110 is migrated from a source host server $120_1$ located in one cloud computing environment $125_1$ to a destination host server $120_2$ located in another cloud computing environment $125_2$. Each of the cloud computing environments $125_{1-2}$ may include a plurality of physical computing devices ("physical machines") (only one shown for each environment) such as source and destination host servers $120_{1-2}$ networked together and each independently managed by a cloud management system comprising VM management servers $115_1$ and $115_2$, respectively.

Illustratively, VM management applications 127, 128 running in VM management servers $115_{1-2}$, provide cloud management systems for cloud computing environments $125_{1-2}$, respectively, that control provisioning of VMs, powering of VMs on and off, and resource management of the VMs in the host servers in the cloud environments, among other things. Although for simplicity only one VM management server $115_1$, $115_2$ is shown for each cloud environment $125_1$, $125_2$ respectively, it should be recognized that a cluster of management servers (not shown) for each environment may be provided for redundancy and/or scale-out. In a particular embodiment, VM management applications 127, 128 may be implementations of vCenter Server™, a product commercially available from VMware, Inc. VM management applications 127, 128 include distributed virtual switch modules 131A, 132A which permit distributed virtual switches 131, 132, respectively to be created for centralized management of network resources in cloud computing environments $125_{1-2}$, respectively. Distributed virtual switches 131, 132 themselves allow virtual switches on multiple host servers in the associated cloud computing environment to be configured and managed as if ports of those virtual switches belonged to a single switch.

Traditionally, live migration of VMs across cloud management systems was not possible, as the migrated VM's configuration file would still point to network resources in the source cloud computing environment even after the VM had been migrated to the destination cloud computing environment. As used herein, live migration of a VM refers to migrating a VM while the VM is running, without shutting down or powering down the VM. When such a live migration is across cloud management systems, the VM would traditionally remain attached to the network resources managed by the source cloud management system even after migration. As a result, the VM would not be connected to network resources on the destination side and thus lack network connectivity after being migrated. One embodiment overcomes this drawback by, prior to VM migration, instantiating distributed virtual ports on the destination host server, reserving the distributed virtual ports on the destination cloud management system, and copying or creating a VM configuration that references the distributed virtual ports (and associated distributed virtual port group(s) and/or distributed virtual switch(es), as appropriate). Then, as part of the migration process, the state of the distributed virtual port to which the VM was connected is copied to the destination host and applied to the new distributed virtual port. As a result, the VM can be detached from the source cloud management system's network resources and attached to the destination cloud management system's network resources, and further the port state from the original distributed virtual port is retained in the new distributed virtual port to which the migrated VM attaches. As the port state is copied from the original distributed virtual port to the new distributed virtual port, the VM does not experience any disruptions in the network state.

In one embodiment, the live migration process may include a pre-callback step prior to VM migration, a migration step in which the VM is actually migrated, and a post-callback step in which clean-up operations are performed. As shown in FIG. 1, the live migration process begins at 101 with VM management server $115_1$ receiving a user-input or automated VM relocate command specifying a VM to migrate and a destination network to which the migrated VM is to connect. For example, the relocate command may be issued via a user interface (not shown) exported by management server $115_1$ or from an automated system such as a distributed resource scheduling (DRS) application running on management server $115_1$ or on a separate server (not shown). As used herein, the source and destination networks refer to what the VM's virtual NIC(s) are connected to before and after migration and may include, e.g., one or more distributed virtual switches, distributed virtual port groups, and distributed virtual ports. That is, what the VM's virtual NIC is connected to is referred to as its network backing, so a "virtual network" is generally some combined group of distributed virtual switch(es), distributed virtual port group(s), and distributed virtual port(s). For example, two virtual NICs connected to separate distributed virtual ports in the same distributed virtual port group may communicate via a VLAN corresponding to the distributed virtual port group and, from that perspective, the two virtual NICs would be in the same virtual network.

During the pre-callback step described in greater detail below with reference to FIG. 2, VM management application 127 validates the user input; gathers necessary information including information about the VM to be migrated and corresponding network resources and configuration; and communicates all information about the migration operation, including the gathered information and the destination network information, to VM management application 128 on the destination side.

During the VM migration step, VM management application 128 validates the destination network information at 103, and if validated, reserves a distributed virtual port 142 on the destination network, shown as distributed virtual switch 132, at 102. In addition, VM management application 128 may send source and destination network information, including configuration information of the reserved distributed virtual port 142 to VM host $120_2$, where a hypervisor agent (not shown) instantiates the distributed virtual port 142. At 103, a VM configuration file 112 modified to reference the reserved distributed virtual port 142 is copied from a source datastore in source host 120₁ to a destination datastore in destination host 120₂, or created in the destination datastore. Then, at 104, VM 110 is actually migrated from source host 120₁ to destination host 120₂. As part of such migration, source distributed virtual port's 141 network state is also copied to destination host 120₂ through a checkpoint process, discussed below, and applied to distributed virtual port 142 that has been instantiated therein.

Where the source and destination virtual networks (e.g., source and destination distributed virtual switches) are in the same cloud management domain, the network state data that is copied from source host 120₁ to destination host 120₂ may include both configuration properties of source distributed virtual port 141 and runtime properties and policies. That is, source distributed virtual port 141 is recreated on the destination side. As used herein, "cloud management domain" refers to an inventory of computers, networks, and storages that is managed by a cloud management system, and "configuration properties" refers to properties such as port ID, version, security configuration, and the like. Runtime properties refers to any other distributed virtual port-specific data to transfer, such as statistics data for the number of inbound and outbound packets, MAC-port bindings data, and data for modules (e.g., data for an encryption module) added to give the distributed virtual port its personality. On the other hand, when the source and the destination virtual networks are in distinct cloud management domains, the copied network states may include only runtime properties and policies of the original distributed virtual port 141, as the newly reserved distributed virtual port 142 may have configuration properties specific to the destination cloud management domain network resources and different from those of the source cloud management system. For example, configuration properties such as port ID, version, quality of service configurations, etc. may be specific to a destination distributed virtual switch. Finally, at 105, the VM is attached (i.e., connected) to distributed virtual port 142 when the migrated VM is resumed on the destination host, based on the VM configuration referencing the reserved distributed virtual port 142. When virtual NICs of VMs are connected with distributed virtual ports, such connections are maintained locally by virtualization software in a host server 120 and in an external table or other data structure within a database in VM management server 115. The VM is thus connected to the specified destination network after the VM is migrated, and resumed on destination host server 120₂.

During the post-callback step described below with reference to FIG. 2, a hypervisor agent (not shown) running in source host 120₁ may perform clean-up operations such as removing the source VM and deallocating source distributed virtual port 141 so that distributed virtual port 141 can be reclaimed (i.e., designated) as a free (or available) port, which can then be bound to a new VM network interface or deleted to conserve resources. In addition, if VM management application 128 determines that the VM migration has failed, then VM management application 128 may remove the reserved distributed virtual port 142 on the destination side.

Figure 2:
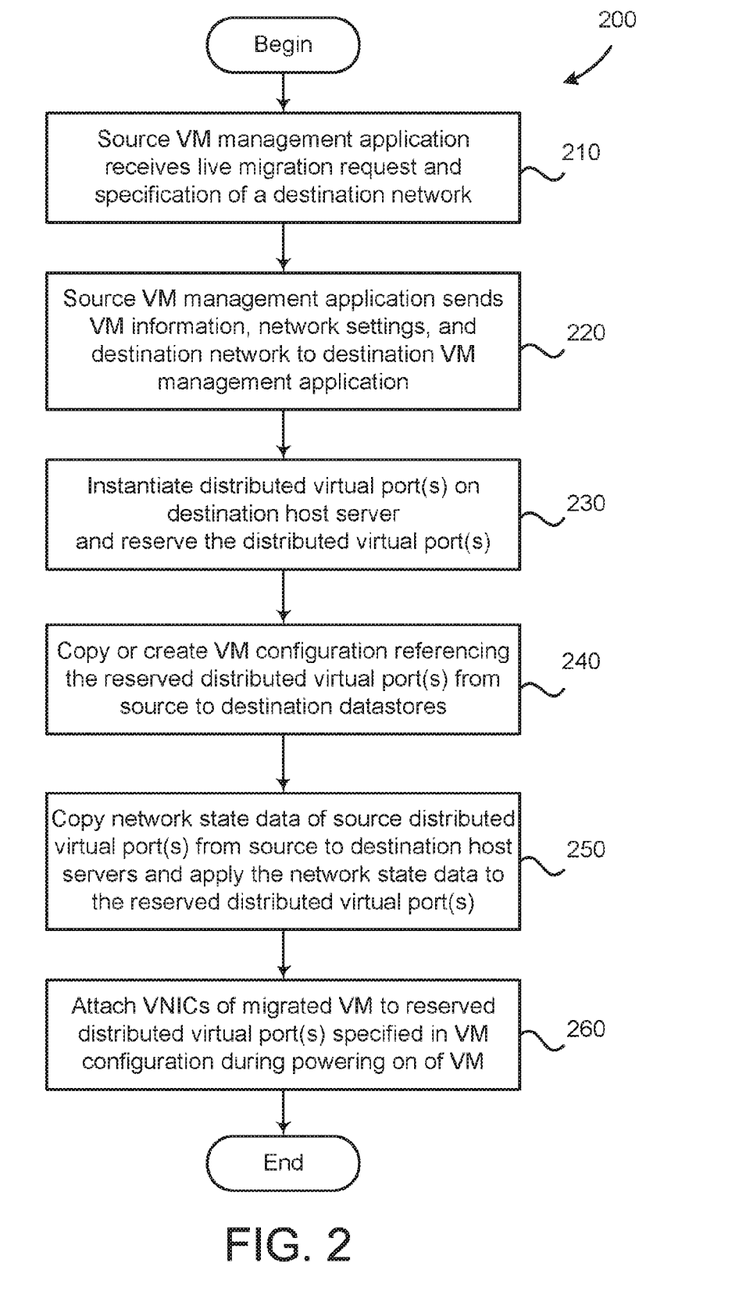
FIG. 2 illustrates a method for migrating virtual machines across virtual switches and virtual networks, according to an embodiment.

FIG. 2 illustrates a method 200 for migrating virtual machines across virtual switches and virtual networks, according to one embodiment. As shown, method 200 begins at step 210, where source VM management application 127 receives a live migration request and specification of a destination network. As discussed, the source and destination networks are what the VM's virtual NIC(s) are connected to and may include, e.g., one or more distributed virtual switches, distributed virtual port groups, and distributed virtual ports. In one embodiment, a VM migration user interface (UI) may be provided that permits a user to request such a live VM migration and specify the destination network to which the migrated VM connects. In such a case, the source VM management application may contact other VM management applications to obtain information on available destination networks that are then provided in the UI.

At step 220, source VM management application 127 sends VM information, network settings, and the destination network to destination VM management application 128. This step occurs in a pre-callback operation during which source VM management application 127 may gather necessary information including information about the VM to be migrated and corresponding network resources and configuration, and then send such information to destination VM management application 128. The VM information may generally include any VM specific information, such as an identifier (ID) associated with the VM, tags, policies, and the like. The destination network is the network to which the migrated VM will connect, as specified by the user or automated system.

At step 230, a distributed virtual switch module running in the destination VM management application instantiates distributed virtual port(s) and reserves the distributed virtual port(s) for each virtual network adapter of the VM. This occurs as part of the VM migration operation, after the pre-callback step. As discussed, the distributed virtual ports may be created in a distributed virtual switch, and each distributed virtual port's configuration information may then be sent to a VM host where a hypervisor agent instantiates the distributed virtual port. It should be understood that a specified distributed virtual port may already exist, and in such a case the existing distributed virtual port(s) may be reserved (e.g., by a user) without having to instantiate a new distributed virtual port. In one embodiment, distributed virtual switch module 132 (FIG. 1) may first validate the destination network to ensure that the network is available, prior to instantiating distributed virtual ports that do not already exist and reserving the distributed virtual ports.

At step 240, a VM configuration is copied from a source datastore to a destination datastore, or created in the destination datastore, and the VM configuration is modified, or created, to reference the reserved distributed virtual port(s). As previously noted, traditionally, a VM migrated across virtual networks could lose network connectivity, as the configuration file of the VM would still point to network resources of the original virtual network. Embodiments provided herein overcome this limitation by reserving distributed virtual ports in the destination virtual network and modifying or creating the VM's configuration file to reference such reserved distributed virtual ports (and associated distributed port group(s) and/or distributed virtual switch(es), as appropriate).

At step 250, network state data of the source distributed virtual port(s) is copied from the source host server to the destination host server and applied to the reserved distributed virtual port(s). In one embodiment, the network state data may be copied via a checkpoint process in which a snapshot of the source distributed virtual port(s) is taken and transmitted to the destination host server over, e.g., a TCP/IP connection. The copied network state data may then be restored to the reserved distributed virtual port(s). In one embodiment, the network state data may be transferred over the same interface used to migrate the execution state data of the VM. That is, along with the data transfer associated with typical VM migration, network state data of distributed virtual port(s) to which the VM's virtual adapters were originally connected may be checkpointed and transmitted in messages over the same communication channel to the destination host server. The network state data may then be restored to the newly reserved distributed virtual port(s) to which the virtual adapters of the VM are to be connected after VM migration.

As discussed, the source virtual network and the destination virtual network may be in the same cloud management domain, and in such a case the copied network state data may include both configuration properties and runtime properties and policies. In this case, the source distributed virtual port, including its configuration properties, is restored. On the other hand, when the source virtual network and the destination virtual network are in distinct cloud management domains, the hypervisor agent may only restore runtime properties and policies of the original distributed virtual port(s) to the newly reserved distributed virtual port(s), as the reserved distributed virtual port(s) may have configuration properties specific to the destination cloud management domain network resources and different from those of the source cloud management system. In such a case, the checkpoint of the source distributed virtual port is restored to a different distributed virtual port in a different network.

At step 260, the destination VM management application (specifically, a hypervisor agent) attaches (i.e., connects) the VNICs of the migrated VM to appropriate reserved distributed virtual port(s) specified in the VM configuration when the VM is resumed. Resuming is the last step of the VM migration, during which execution of the migrated VM is resumed on the destination host and carries on the operation of the original VM. The migrated VM may initially run in a shadow mode and receives dirty copy data (e.g., memory state, disk write state, network state, etc.) from the original VM, until the migrated VM is promoted to the official VM and the original VM's state on the source host server is then deleted.

After the VNICs of the migrated VM are attached to the reserved distributed virtual port(s) of a destination distributed virtual switch, additional post-callback operations may be performed, including reclaiming the original distributed virtual port(s) used by the VM prior to migration as free distributed virtual port(s). In addition, if the destination VM management application determines that the VM migration has failed, then that VM management application may remove the reserved distributed virtual port on the destination side.

Figure 3:
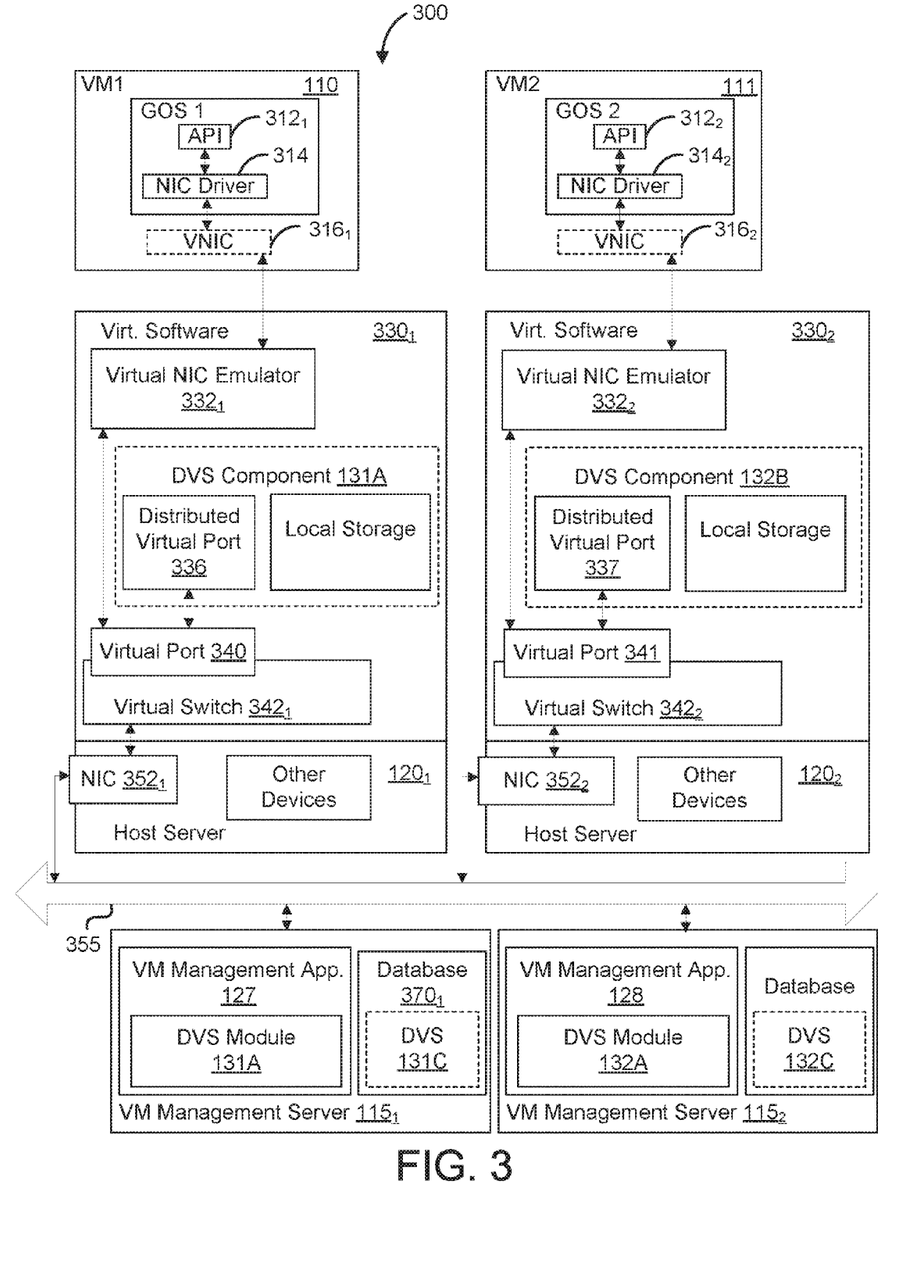
FIG. 3 depicts a simplified block diagram of a virtualized computer system in which one or more embodiments may be implemented.

FIG. 3 depicts a simplified block diagram of a virtualized computer system 300 in which one or more embodiments may be implemented. Each host server $120_{1-2}$ includes a plurality of VMs (e.g., VMs 110, 111) instantiated thereon and a virtual switch, shown as virtual switches $342_{1-2}$. Host servers $120_{1-2}$ are configured to deliver virtualization-based distributed services to information technology environments. Each of host server $120_{1-2}$ provides a virtualization layer that abstracts processor, memory, storage, and/or networking resources into multiple VMs that run side-by-side on the same host server. In one embodiment, virtualization software can be installed directly on the server hardware and inserts a virtualization layer between the hardware and the operating system. The virtualization software partitions each of host servers $120_{1-2}$ into multiple secure and portable VMs (e.g., VMs 110, 111) that run on the same host server. Thus, each VM 110-111 represents a complete system—with processors, memory, networking, storage, and/or BIOS.

Virtual switches $342_{1-2}$ in host servers $120_{1-2}$ are each a software implementation of a layer 2 switch, each including a plurality of virtual (i.e., software-implemented) ports, such as virtual ports 340, 341. Each virtual port may connect to or be associated with a virtual network interface, such as VNICs $316_{1-2}$ instantiated in a virtualization layer supporting VMs 110, 111. Each VM may be logically connected to a virtual port on virtual switches $342_{1-2}$ which is, in turn, logically connected to physical NICs (e.g., PNICs $352_{1-2}$) in host server 110. Each PNIC is connected to a physical network and may communicate with other PNICs and the outside world via a router or a switch.

A user may use the distributed virtual switch abstraction to manage a plurality of virtual switches on one or more host servers. Distributed virtual switches 131, 132 include distributed virtual ports (e.g., distributed virtual ports 336, 337) which are software abstractions capturing the configuration and runtime states of the virtual ports of virtual switches. In one embodiment, each distributed virtual port stores data structures representing the configuration and runtime state of a corresponding virtual port of distributed virtual switch 131, 132. Distributed virtual switches 131, 132 themselves may span multiple virtual switches on host servers, thereby permitting a user to manage every virtual port of those virtual switches as though they were part of a larger virtual switch, namely distributed virtual switches 131, 132. As discussed, when virtual NICs of VMs are connected to distributed virtual ports, such connections are maintained locally by virtualization software $330_{1-2}$ and in a table or other data structure 131C, 132C within databases.

As shown, VM management servers $115_{1-2}$ run VM management applications 127, 128, which may provide cloud management systems and which include distributed virtual switch modules 131A, 132A. As discussed, VM management applications 127, 128 manage virtualization infrastructures, including managing host servers, virtual machines running within each host server, provisioning, migration, resource allocation, and so on. For example, VM management applications 127, 128 may be VMware vCenter™ applications. In one embodiment, VM management application 127 and distributed virtual switch module 131A running therein are configured to facilitate live migration of VMs across virtual networks by transmitting VM information, network settings, and a destination network to destination VM management application 132, where distributed virtual switch module 132A reserves distributed virtual port(s) for each VNIC of the VM to be migrated. Network states of the original distributed virtual port(s) to which the VNICs were connected may then be copied and applied to the reserved distributed virtual port(s) via a checkpoint process during the migration of the VM, and the migrated VM may be connected on power-on to the reserved distributed virtual port(s) based on a VM configuration which is created (or modified) to reference the reserved distributed virtual port(s), according to the method 200 discussed above with respect to FIG. 2.

Advantageously, embodiments disclosed herein permit VMs to be migrated live across virtual networks. Traditionally, VM network connectivity could be lost when a VM was migrated across cloud management systems with distinct virtual networks, such as distributed virtual switches, as the migrated VM would still rely on the network resources associated with the source virtual network. Embodiments disclosed herein instantiate and reserve distributed virtual port(s) on a destination side, copy the network state data of the old distributed virtual port(s) to the reserved distributed virtual port(s), and connect the migrated VM to the reserved distributed virtual port(s), thereby providing network connectivity for the migrated VM in a manner transparent to applications running in the VM, including the guest operating system. As a result, VMs may be migrated to any location having a virtual infrastructure that provides the same network connectivity and configuration/policies. In particular, VMs may be migrated across a logical network that spans across multiple cloud management systems and/or distributed virtual switches, such as a VXLAN used to create an L2 overlay network to stretch across two or more layer L3 networks or a VLAN backed virtual networks, both of which may span across multiple distributed virtual switches.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for migrating a virtual machine (VM) across virtual networks from a source distributed virtual switch on a source host machine in a first virtual network where a virtual network adapter of the VM is connected to a first distributed virtual port of the source distributed virtual switch to a destination distributed virtual switch on a destination host machine in a second virtual network, wherein the source distributed virtual switch is distinct from the destination distributed virtual switch, comprising:

reserving, prior to migrating the VM from the source host machine to the destination host machine, a second distributed virtual port on the destination distributed virtual switch for the virtual network adapter of the VM;

receiving, at the destination host machine, a copy of a configuration of the VM from the source host machine;

modifying, at the destination host machine, the copy of the configuration of the VM as to reference the second distributed virtual port instead of the first distributed virtual port;

receiving a copy of network state data of the first distributed virtual port;

applying the copy of network state data to the second distributed virtual port on the destination distributed virtual switch; and subsequent to migrating the VM from the source host machine to the destination host machine, connecting the virtual network adapter of the VM to the second distributed virtual port on the destination distributed virtual switch.

2. The method of claim 1, wherein the copy of network state data includes configuration properties and runtime properties and policies.

3. The method of claim 1, wherein the copy of network state data includes runtime properties and policies but does not include configuration properties of the first distributed virtual port that are specific to the first virtual network.

4. The method of claim 3, further comprising, live migrating the VM across distinct cloud management domains.

5. The method of claim 1, further comprising, receiving a user selection of the second virtual network to which the migrated VM is to be connected, wherein the second distributed virtual port on the destination distributed virtual switch is reserved based on the selected second virtual network.

6. The method of claim 1, wherein the copy of network state data of the first distributed virtual port is copied via a same interface used to migrate the VM.

7. The method of claim 1, further comprising, reclaiming the first distributed virtual port on the source distributed virtual switch as a free distributed virtual port.

8. A non-transitory computer-readable storage medium comprising instructions for migrating a virtual machine (VM) across virtual networks from a source distributed virtual switch on a source host machine in a first virtual network where a virtual network adapter of the VM is connected to a first distributed virtual port of the source distributed virtual switch to a destination distributed virtual switch on a destination host machine in a second virtual network, wherein the source distributed virtual switch is distinct from the destination distributed virtual switch by performing operations comprising:

reserving, prior to migrating the VM from the source host machine to the destination host machine, a second distributed virtual port on the destination distributed virtual switch for the virtual network adapter of the VM;

receiving, at the destination host machine, a copy of a configuration of the VM from the source host machine;

modifying, at the destination host machine, the copy of the configuration of the VM as to reference the second distributed virtual port instead of the first distributed virtual port;

receiving a copy of network state data of the first distributed virtual port;

applying the copy of network state data to the second distributed virtual port on the destination distributed virtual switch; and subsequent to migrating the VM from the source host machine to the destination host machine, connecting the virtual network adapter of the VM to the second distributed virtual port on the destination distributed virtual switch.

9. The non-transitory computer-readable storage medium of claim 8, wherein the copy of network state data includes configuration properties and runtime properties and policies.

10. The non-transitory computer-readable storage medium of claim 8, wherein the copy of network state data includes runtime properties and policies but does not include configuration properties of the first distributed virtual port that are specific to the first virtual network.

11. The non-transitory computer-readable storage medium of claim 10, the operations further comprising, live migrating the VM across distinct cloud management domains.

12. The non-transitory computer-readable storage medium of claim 8, the operations further comprising, receiving a user selection of the second virtual network to which the migrated VM is to be connected, wherein the second distributed virtual port on the destination distributed virtual switch is reserved based on the selected second virtual network.

13. The non-transitory computer-readable storage medium of claim 8, wherein the copy of network state data of the first distributed virtual port is copied via a same interface used to migrate the VM.

14. The non-transitory computer-readable storage medium of claim 8, the operations further comprising, reclaiming the first distributed virtual port on the source distributed virtual switch as a free distributed virtual port.

15. A system, comprising:
a memory; and
a processor storing one or more applications, which, when executed on the processor, perform operations for migrating a virtual machine (VM) across virtual networks from a source distributed virtual switch on a source host machine in a first virtual network where a virtual network adapter of the VM is connected to a first distributed virtual port of the source distributed virtual switch to a destination distributed virtual switch on a destination host machine in a second virtual network, wherein the source distributed virtual switch is distinct from the destination distributed virtual switch, the operations comprising:

reserving, prior to migrating the VM from the source host machine to the destination host machine, a second distributed virtual port on the destination distributed virtual switch for the virtual network adapter of the VM;

receiving, at the destination host machine, a copy of a configuration of the VM from the source host machine;

modifying, at the destination host machine, the copy of the configuration of the VM as to reference the second distributed virtual port instead of the first distributed virtual port;

receiving a copy of network state data of the first distributed virtual port;

applying the copy of network state data to the second distributed virtual port on the destination distributed virtual switch; and subsequent to migrating the VM from the source host machine to the destination host machine, connecting the virtual network adapter of the VM to the second distributed virtual port on the destination distributed virtual switch.

16. The system of claim 15, wherein the copy of network state data includes configuration properties and runtime properties and policies.

17. The system of claim 15, wherein the copy of network state data includes runtime properties and policies but does not include configuration properties of the first distributed virtual port that are specific to the first virtual network.

* * * * *